US012802503B2

(12) United States Patent
Böhse et al.

(10) Patent No.: US 12,802,503 B2
(45) Date of Patent: Nov. 17, 2026

(54) DEVICE FOR HEIGHT LEVEL DETERMINATION

(71) Applicant: ZF Friedrichshafen AG, Friedrichshafen (DE)

(72) Inventors: Marcel-Frederic Böhse, Preußisch Oldendorf (DE); Alexander Lundberg, Melle (DE); Julian Stratmann, Bad Essen (DE); Carlos Wübbeler, Melle (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 29 days.

(21) Appl. No.: 18/969,909

(22) Filed: Dec. 5, 2024

(65) Prior Publication Data

US 2025/0182541 A1 Jun. 5, 2025

(30) Foreign Application Priority Data

Dec. 5, 2023 (DE) ..................... 10 2023 212 217.0

(51) Int. Cl.
*G07C 5/00* (2006.01)
*G07C 5/08* (2006.01)

(52) U.S. Cl.
CPC .................................. *G07C 5/0808* (2013.01)

(58) Field of Classification Search
None
See application file for complete search history.

(56) References Cited

FOREIGN PATENT DOCUMENTS

| | | | | |
|---|---|---|---|---|
| DE | 10 2018 210 586 B3 | | 11/2019 | |
| WO | 2018033321 A1 | | 2/2018 | |
| WO | WO2018033321 | * | 2/2018 | ........... B60G 17/019 |

OTHER PUBLICATIONS

Machine Translation of WO2018/033321 (Year: 2018).*
German Patent Office, German Office Action issued in German patent application No. 10 2023 212 217.0 (Jul. 23, 2024).

* cited by examiner

*Primary Examiner* — James M Mcpherson
(74) *Attorney, Agent, or Firm* — Secant IP, P.L.L.C.

(57) ABSTRACT

A device is provided for determining the height level of a vehicle having a chassis and a vehicle body carried by the chassis and connected by vehicle springs to unsprung components of the chassis. Vehicle wheels are articulated to the vehicle body by suspension control arms. Sensor arrangements on the unsprung components of the chassis and/or on the control arms, have at least one acceleration sensor or several acceleration sensors to detect translational accelerations in different spatial directions and generate acceleration signals to characterize the accelerations. An evaluation unit connected to the sensor arrangements includes at least one rotation rate sensor to detect rotation movements about different rotation axes and generate body rotation movement signals characterizing the rotation movements can be generated. The evaluation unit determines one or more wheel strokes of the vehicle wheels from the acceleration signals and the rotation movement signals.

14 Claims, 7 Drawing Sheets

DEVICE FOR HEIGHT LEVEL DETERMINATION

RELATED APPLICATIONS

This application claims the benefit of and right of priority under 35 U.S.C. § 119 to German Patent Application no. 10 2023 212 217.0, filed on 5 Dec. 2023, the contents of which are incorporated herein by reference in its entirety.

FIELD OF THE DISCLOSURE

The invention relates to a device for height level determination in a vehicle, which comprises: a chassis with a plurality of vehicle wheels that stand or roll on a ground surface, a vehicle body supported on the chassis which is connected by vehicle springs to unsprung components of the chassis, which include the vehicle wheels which are articulated to the vehicle body by suspension control arms, a plurality of sensor arrangements at least one of which is a body sensor arrangement on the vehicle body and one or more sensor arrangements are provided on the unsprung components of the chassis and/or on the suspension control arms, wherein each sensor arrangement comprises at least one or more acceleration sensors by means of which translational accelerations in various spatial directions can be detected and acceleration signals that characterize the accelerations can be generated, and an evaluation device connected to the sensor arrangements.

BACKGROUND

DE 10 2018 210 586 B3 discloses a device for the automatic headlight range adjustment of a front headlight device of a vehicle comprising a plurality of vehicle wheels with air-filled tires, which comprises: a control unit designed to determine a pitch angle of the vehicle and to adjust the light output of the front headlight device on the basis of the pitch angle determined, a first acceleration sensor on the vehicle in an essentially fixed orientation relative to the ground on which the vehicle is standing, and a second acceleration sensor on the vehicle in a fixed orientation relative to the front headlight device of the vehicle, which are designed in each case to measure at least the acceleration at the location of the respective acceleration sensor, wherein the control unit is designed to determine the pitch angle on the basis of directions of the accelerations measured by the first and second acceleration sensors.

A device according to DE 10 2018 210 586 B3 could be suitable for height level determination. However, owing to the vehicle springs the body can sway relative to the unsprung components of the chassis, so that determining the orientation of the vehicle body relative to the unsprung components of the chassis with the help of translational acceleration sensors can be inaccurate. Accordingly, therefore, a height level determined in that way can also be inaccurate.

SUMMARY

Starting from there, the purpose of the present invention is in particular to be able to improve the accuracy of height level determinations.

According to the invention this objective is achieved by a device and a method as disclosed herein. Preferred further developments of the invention emerge from the present disclosure.

A device for height level determination in a vehicle comprising a chassis with a plurality of vehicle wheels which stand or roll on a ground surface, a vehicle body supported on the chassis, which is connected by vehicle springs to unsprung components of the chassis, which comprise the vehicle wheels articulated to the vehicle body by suspension control arms, a plurality of sensor arrangements at least one of which is a body sensor arrangement on the vehicle body and one or more chassis sensor arrangements are provided on the unsprung components of the chassis and/or on the suspension control arms, wherein each sensor arrangement comprises at least one or more acceleration sensors by means of which translational accelerations in various spatial directions can be determined and acceleration signals that characterize the accelerations can be generated, and an evaluation unit connected to the sensor arrangements, is according to the invention in particular developed further in that the body sensor arrangement comprises at least one or more rotational movement sensors by means of which rotation movements about various rotation axes can be detected and body rotation movement signals that characterize the rotation movements can be generated, such that from the acceleration signals and the body rotation signals, the evaluation unit can determine one or more wheel strokes of the vehicle wheels.

If the at least one acceleration sensor or the acceleration sensors of the body sensor arrangement undergo a rotation movement owing to a swaying vehicle body, the acceleration signals produced by the acceleration sensor or sensors can comprise, besides the translational signal components, also rotational signal components which can reduce the accuracy of the wheel stroke determination. By detecting the rotation movements, it is possible, at least partially, to discount or compensate these rotational signal components and thereby to increase the accuracy of the one or more wheel strokes.

The invention also relates in particular to a method for height level determination in a vehicle that comprises a chassis with a plurality of vehicle wheels standing or rolling on a ground surface, a vehicle body supported on the chassis which is connected by vehicle springs and unsprung components of the chassis which comprise the vehicle wheels, which are articulated by suspension control arms to the vehicle body, and a plurality of sensor arrangements, at least one of which is a body sensor arrangement provided on the vehicle body while one or more chassis sensor arrangements are provided on the unsprung chassis components and/or on the suspension control arms, wherein each sensor arrangement comprises at least one or more acceleration sensors by means of which translational accelerations in various spatial directions are detected and these generate acceleration signals that characterize the accelerations. In particular the method is further developed in that the body sensor arrangement comprises at least one or more rotation movement sensors by means of which rotation movements about various rotation axes are detected and these rotation movements generate body rotation signals that characterize the rotation movements, such that from the acceleration signals and the body rotation signals one or more wheel strokes of the vehicle wheels are determined.

Preferably, the vehicle according to the method comprises an evaluation unit connected to the sensor arrangements, by means of which the one or more wheel strokes of the vehicle wheels are determined from the acceleration signals and the rotation movement signals.

The method according to the invention is preferably carried out with the device according to the invention. In particular, the method according to the invention can be developed further in accordance with all the design versions explained in connection with the device according to the invention. Furthermore, the device according to the invention can for example be developed further in accordance with all the versions explained in connection with the method according to the invention.

From the one or more wheel strokes of the vehicle wheels, there follow in particular one or at least one height level of the vehicle and/or the vehicle wheels. The expression "at least one" preferably also includes the sense of "one" or "exactly one".

Preferably, by means of the evaluation device and assisted by and/or taking into account the body rotation signals, rotational signal components are generated in the acceleration signals produced by the at least one or more acceleration sensors of the body sensor arrangement, which in particular can be at least partially discounted and/or compensated and which are discounted and/or compensated.

Preferably, in particular by means of the evaluation unit, one or more wheel stroke signals that characterize the one or more wheel strokes can be and/or are generated.

Preferably, in particular by means of the evaluation unit, for each wheel stroke one or at least one wheel stroke signal that characterizes the respective wheel stroke can be and/or is generated.

The number of vehicle wheels is preferably four. Preferably, the vehicle wheels are arranged at corners of the vehicle. The number of such corners is in particular four. Preferably, for each vehicle wheel a wheel carrier is provided for carrying the wheel. Preferably each wheel is mounted to rotate on its wheel carrier, for example by means of a wheel bearing and in particular about a wheel rotation axis. Advantageously, the wheel carriers are articulated by the suspension control arms to the vehicle body. Thereby, in particular the vehicle wheels are articulated to the vehicle body by way of the suspension control arms. Preferably the chassis includes the suspension control arms and/or the wheel carriers.

Preferably, each vehicle wheel and/or each wheel carrier is articulated to the vehicle body by one or at least one, or by two or more of the suspension control arms. Each suspension control arm is in particular a transverse control arm. For example, each vehicle wheel and/or each wheel carrier is articulated to the vehicle body by two or more of the suspension control arms, preferably arranged one above another in a vertical direction of the vehicle, one of which is in particular a lower transverse control arm and another is in particular an upper transverse control arm.

Advantageously, the chassis is provided with at least one vehicle axle which, in particular, has two or at least two of the vehicle wheels. Preferably the chassis is provided with several vehicle axles which, in particular, each have two or at least two of the vehicle wheels. One of the axles is in particular a front axle. One, or one other of the axles is in particular a rear axle. Preferably the chassis is provided with the, or with a front axle which in particular has two or at least two of the vehicle wheels. The vehicle wheels of the front axle are in particular called the front wheels. Preferably the chassis is provided with the, or with a rear axle which in particular has two or at least two of the vehicle wheels. The vehicle wheels of the rear axle are in particular called the rear wheels. The number of vehicle axles is advantageously two or at least two. Each vehicle axle preferably has a left-hand vehicle wheel and a right-hand vehicle wheel of the vehicle wheels. Preferably, the expressions "right-hand" and "left-hand" refer to the vehicle coordinate system, or to a vehicle coordinate system such that in particular "left-hand" means that as seen from the, or from a vehicle longitudinal axis, a vehicle wheel is arranged offset in the, or in a transverse direction of the vehicle and in particular "right-hand" means that as seen from the, or from a vehicle longitudinal axis, a vehicle wheel is offset in the, or in an opposite transverse vehicle direction.

Preferably, each chassis sensor arrangement is provided on one of the vehicle wheels and/or on a wheel suspension of one of the vehicle wheels and/or on one of the wheel carriers carrying one of the wheels and/or on one of the suspension control arms and/or at one of the corners of the vehicle. The number of chassis sensor arrangements is, for example, one or at least one, or two or at least two or three or at least three or four or at least four.

The number of chassis sensor arrangements preferably corresponds to the number of vehicle wheels. For example, the number of chassis sensor arrangements corresponds to the number of front wheels and/or the number of rear wheels. The number of front wheels is in particular two. Moreover, the number of rear wheels is in particular two. Preferably, one of the chassis sensor arrangements is associated with each vehicle wheel. For example, one of the chassis sensor arrangements is associated with each front wheel and/or each rear wheel. Preferably, one of the chassis sensor arrangements is provided in the area of each vehicle wheel. For example, one of the chassis sensor arrangements is provided in the area of each front wheel and each rear wheel. Preferably, one of the chassis sensor arrangements is provided on each of the wheel carrier or carriers that carry the vehicle wheels. For example, one of the chassis sensor arrangements is provided on the carriers carrying each front wheel and/or each rear wheel. Preferably, at each vehicle wheel one of the chassis sensor arrangements is provided on the, or on one, or on at least one of the respective suspension control arms which articulate the vehicle wheel to the vehicle body. Preferably, at each front wheel one of the chassis sensor arrangements is provided on the, or on one, or on at least one of the respective suspension control arms which articulate the front wheels to the vehicle body. Advantageously, at each rear wheel one of the chassis sensor arrangements is provided on the, or on one, or on at least one of the respective suspension control arms which articulate the rear wheels to the vehicle body.

Advantageously, in the area of each vehicle wheel of the at least one vehicle axle, or of one or at least one of the vehicle axles or of each vehicle axle, one or at least one of the chassis sensor arrangements is provided and/or arranged. In particular, on the at least one vehicle axle or on at least one of the vehicle axles or on each vehicle axle, one of the chassis sensor arrangements is provided for each vehicle wheel on the wheel carrier carrying the vehicle wheel or each respective vehicle wheel. Preferably, on the front axle, for each vehicle wheel a chassis sensor arrangement is provided on the wheel carrier, or on one of the wheel carriers, or on each of the wheel carriers carrying the respective vehicle wheel. In particular, on the at least one vehicle axle or on at least one of the vehicle axles or on each vehicle axle, for each vehicle wheel or one of the wheels or at least one of the wheels one of the chassis sensor arrangements is provided on the suspension control arm that articulates the vehicle wheel concerned to the vehicle body. Preferably, on the front axle, for each vehicle wheel one of the chassis sensor arrangements is provided on the suspension control arm that articulates the vehicle wheel, or a vehicle wheel, or at least one of the vehicle wheels or the respective vehicle wheel to the vehicle body. Advantageously, on the rear axle, for each wheel one of the sensor arrangements is provided on the suspension control arm, or on a suspension control arm, or on at least one of the suspension control arms which articulates that vehicle wheel, or the vehicle wheel concerned, to the vehicle body.

Preferably, the body sensor arrangement is positioned in a fixed orientation relative to the vehicle body. Preferably, each chassis sensor arrangement is positioned in a fixed orientation relative to one of the suspension control arms or to the suspension control arm concerned or to the unsprung components of the chassis and/or to one of the wheel carriers or to the wheel carrier concerned. Advantageously each chassis sensor arrangement, in particular when it is positioned in a fixed orientation relative to the unsprung components of the chassis, is arranged in a fixed or essentially fixed orientation relative to the ground surface. Here, the expression “essentially” refers in particular to a springiness of the unsprung components of the chassis relative to the ground, caused by pneumatic tires. The influence of that springiness is in particular negligible.

According to an advantageous further development, the at least one rotational movement sensor or the rotational movement sensors of the body sensor arrangement are designed as a rotation rate sensor or rotation rate sensors, by means of which in particular the rotation movements are and/or can be determined in the form of angular velocities. The body rotation movement signals are in particular angular velocity signals and can for example also be referred to as angular velocity signals. To determine and/or estimate the rotational signal components in the acceleration signals generated by the acceleration sensors in the body sensor arrangement, the angular velocity signals can for example be integrated over time.

The body sensor arrangement is preferably designed to detect three translational degrees of freedom. Preferably, the body sensor arrangement is designed to detect three rotational degrees of freedom. In particular, the body sensor arrangement is designed to detect six kinematic degrees of freedom.

Preferably, the body sensor arrangement can detect translational accelerations in three different spatial directions. Preferably, the body sensor arrangement can detect translational accelerations in three different body sensor arrangement directions. Preferably, each of the rotation axes of the body sensor arrangement extends in one of the body sensor arrangement directions. Advantageously, the rotation axes of the body sensor arrangement intersect at a common origin.

The body sensor arrangement is preferably in the form of an inertial measurement unit (IMU), particularly in the form of a micro-system (MEMS). The rotation rate sensors are for example also called gyroscopes. Inertial measurement units in the form of micro-systems take up only little fitting space, require little maintenance and are available relatively cheaply.

In an advantageous design each chassis sensor arrangement is designed to detect three or at least three kinematic degrees of freedom. In particular, each chassis sensor arrangement is designed to detect three translational degrees of freedom.

In an advantageous further development, each chassis sensor arrangement comprises at least one or more than one rotational movement sensor, by means of which rotational movements about different rotation axes are and/or can be detected and chassis rotational movement signals that characterize those rotational movements are or can be generated. Preferably, the one or more wheel strokes of the vehicle wheels are and/or can be determined, in particular by means of the evaluation unit, also taking into account the chassis rotational movement signals. Preferably, the one or more wheel strokes of the vehicle wheels are and/or can be thus determined from the acceleration signals, the body rotation signals and the chassis rotation signals, preferably by means of the evaluation unit. In particular, in that way the orientation of the chassis and/or of one or more vehicle wheels and/or one or more suspension control arms and/or the ground surface can be determined more accurately and thus also the accuracy with which the one or more wheel strokes of the vehicle wheels are determined can be increased.

Preferably by means of the evaluation unit with the help of and/or taking into account the chassis rotational movement signals from each chassis sensor arrangement, rotational signal components in the acceleration generated by the acceleration sensors in the respective chassis sensor arrangement can preferably be discounted and/or compensated, in particular at least discounted and/or compensated in part.

According to an advantageous design the at least one rotational movement sensor is designed as a rotation rate sensor, or the rotational movement sensors of each chassis sensor arrangement are in the form of rotation rate sensors, by means of which the particular respective rotational movements are and/or can be detected in the form of angular velocities.

The chassis rotational movement signals are in particular angular velocity signals and can also for example be referred to as chassis angular velocity signals. To determine and/or estimate the rotational signal components in the acceleration signals generated by the acceleration sensors of each chassis sensor arrangement, the respective chassis angular velocity signals can for example be integrated over time.

Each chassis sensor arrangement is designed for example to detect three rotational degrees of freedom. Preferably, each chassis sensor arrangement is designed to detect six kinematic degrees of freedom.

Preferably, each chassis sensor arrangement can detect translational accelerations in three different spatial directions. Advantageously, each chassis sensor arrangement can detect translational accelerations in three different chassis sensor arrangement directions.

Preferably, in each chassis sensor arrangement each of the rotation axes extends in one of the chassis sensor arrangement directions of the chassis sensor arrangement concerned.

Advantageously, the rotation axes of each chassis sensor arrangement intersect, in each case, at a common origin.

Each chassis sensor arrangement preferably consists of an inertial measuring unit (IMU) in the form of a micro-system (MEMS). The rotation rate sensors are also for example called gyroscopes.

In an advantageous further development, in particular by means of the evaluation unit a pitch angle of the vehicle is and/or can be determined from the signals generated by the sensor arrangements. Preferably, in particular by means of the evaluation unit, at least one pitch angle signal that characterizes the pitch angle is and/or can be generated. The pitch angle is in particular an inclination angle of the vehicle.

In an advantageous design, in particular by means of the evaluation unit a roll angle of the vehicle is and/or can be determined from the signals generated by the sensor arrangements. Preferably, in particular by means of the evaluation unit at least one roll angle signal that characterizes the roll angle is and/or can be generated. The roll angle is in particular one or another inclination angle of the vehicle. The pitch angle and the roll angle extend for example transversely to one another.

According to an advantageous further development, in particular by means of the evaluation unit, on the basis of the signals generated by the body sensor arrangement, for example one or more information particulars about the orientation of the body is/are or can be determined which in particular characterize the orientation of the vehicle body. The one or more body orientation information particulars is/are and/or can in particular be generated in the form of one or more body orientation signals, preferably by means of the evaluation unit. Preferably, in particular by means of the evaluation unit, on the basis of the signals generated by the one or more chassis sensor arrangements, for example one or more information particulars about the orientation of the vehicle wheels is/are or can be determined, which characterize the orientation or orientations of one or more of the vehicle wheels, or of one, or of several of the vehicle wheels. The one or more vehicle wheel orientation information particulars is/are or can in particular be generated in the form of one or more vehicle wheel orientation signals, preferably by means of the evaluation unit. Preferably, in particular by means of the evaluation unit, on the basis of the signals generated by the one or more chassis sensor arrangements, for example one or more suspension control arm orientation information particulars are and/or can be determined, which in particular characterize the orientation or orientations of the one or more suspension control arms. The one or more suspension control arm orientation particulars are and/or can in particular be generated in the form of one or more suspension control arm orientation signals, preferably by means of the evaluation unit.

In particular, from the body orientation information or information particulars and from the vehicle wheel orientation information or information particulars and/or the suspension control arm orientation information or information particulars, the one or more wheel stroke(s) of the vehicle wheels are and/or can be determined. Since the positional relationships between the vehicle body, the suspension control arms and the vehicle wheels are determined in particular by the chassis, for each vehicle wheel, from its orientation and/or from the orientation of at least one of the suspension control arms that articulate that wheel, or the vehicle wheel concerned, to the vehicle body and from the orientation of the vehicle body the wheel stroke can be determined. Moreover, for example from the one or more wheel strokes of the vehicle wheels the pitch angle or a pitch angle and/or the roll angle or a roll angle can be determined, in particular by means of the evaluation unit.

Preferably, by means of the evaluation unit, on the basis of the signals generated by the one or more chassis sensor arrangements, one or more chassis orientation information particulars and/or ground surface orientation information particulars are and/or can be determined, which in particular characterize the orientation of the chassis and/or the ground surface. The one or more chassis orientation particulars and/or ground surface particulars are and/or can be generated in particular in the form of chassis orientation signals or ground surface orientation signals, preferably by means of the evaluation unit. Preferably, from the body orientation or the chassis orientation or the ground orientation information or information particulars, the pitch angle or a pitch angle and/or the roll angle or a roll angle are and/or can be determined. The chassis orientation information characterizes in particular the orientation of the chassis and/or the unsprung components of the chassis, such as the orientation or orientations of at least one or more of the vehicle wheels or wheel carriers. The ground orientation information characterizes in particular the orientation of the ground, which for example is a road or street. The orientation of the ground can thus, for example, also be called the road orientation and/or the street orientation. The one or more chassis orientation information particulars preferably correspond to the one or more ground orientation particulars, especially when the influence of pneumatic tires is ignored.

The one or more body orientation particulars include for example a first body direction information particular, for example in a vehicle length-height plane. The one or more chassis orientation particulars or ground orientation particulars include for example a first chassis or ground direction particular, for example in the vehicle length-height plane, or in a vehicle length-height plane. If each direction particular is for example in the form of an angle, especially relative to the same reference axis, the pitch angle is given for example by a difference between these angles.

The one or more body orientation particulars include for example a second body direction particular, for example in a vehicle width-height plane. The one or more chassis orientation particulars or ground orientation particulars include for example a second chassis or ground direction particular, for example in the vehicle width-height plane, or in a vehicle width-height plane. If each direction particular is for example in the form of an angle, especially relative to the same reference axis, the roll angle is given for example by a difference between these angles.

Preferably, the body orientation particulars characterize a body plane that represents the vehicle body. Preferably, the chassis orientation particulars characterize a chassis plane that represents the chassis and/or the unsprung components of the chassis. Advantageously, the ground surface orientation particulars characterize a ground plane that represents the ground. For example, the chassis plane corresponds to the ground surface plane or extends parallel to it. In particular, the pitch angle or angles and/or the roll angle or angles are and/or can be determined from the position of the body plane relative to the chassis plane or the ground plane.

The body plane is described for example by a body plane vector that extends perpendicularly to it. The chassis plane is described for example by a chassis plane vector that extends perpendicularly to it. The ground surface plane is described for example by a ground plane vector that extends perpendicularly to it. The chassis plane vector corresponds in particular to the ground plane vector. For example, between the body plane vector and the chassis plane vector or the ground plane vector an angle is enclosed due to the superimposition of pitching and rolling.

According to an advantageous design, a headlight device or at least one headlight device with at least one headlight and at least one headlight adjusting drive is provided, in particular connected to the evaluation unit, by means of which the inclination of the headlight and/or a light beam emitted by it is and/or can be adjusted as a function of the pitch angle, preferably relative to the vehicle body. Preferably, the headlight device comprises a headlight holding device on which the at least one headlight is in particular mounted so that it can be tilted and/or swiveled. The at least one headlight is in particular a front headlight. Instead of the expression “light beam”, for example the expression “light cone” can also be used. Preferably, the body sensor arrangement is arranged at a fixed orientation relative to the headlight device and/or to the headlight holding device. The at least one headlight holding device is preferably in a fixed position on the vehicle body. Preferably the headlight device comprises two headlights and/or two headlight adjusting drives and/or two headlight holding devices. For example, the vehicle comprises the headlight device or the at least one headlight device.

The evaluation unit preferably comprises a digital computer and/or consists of one. Preferably, the evaluation unit comprises a plurality of analog-digital converters by means of which sensor signals delivered by the sensors are and/or can be digitalized.

In an advantageous further development, the evaluation unit comprises at least one or more estimators, for example particularly in each case based on an observer and/or a Kalman filter. Preferably, by means of the at least one or more estimators the one or more wheel strokes of the vehicle wheels are and/or can be determined by estimation. Preferably, particularly also by means of the at least one or more estimators the pitch angle and/or the roll angle and/or the orientation of the ground is/are or can be determined. Preferably, the estimator or estimators or at least one of the estimators is and/or can be optimized in particular by at least one optimizer, for example by minimizing at least one quality function.

Preferably, the evaluation unit and/or the at least one estimator or the estimators include a body estimator by means of which, particularly on the basis of the signals delivered by the body sensor arrangement, one or more, or the one or the several body orientation signals that preferably characterize the orientation of the vehicle body, is/are and/or can be determined.

Preferably, the evaluation unit and/or the at least one estimator or the estimators include a chassis estimator or a ground surface estimator by means of which, particularly on the basis of the signals delivered by the chassis sensor arrangement, one or more, or the one or the several chassis or ground orientation signals, preferably those that characterize the orientation of the chassis and/or the ground surface, are and/or can be determined.

Advantageously, the evaluation unit and/or the at least one estimator or the estimators include a wheel stroke estimator, by means of which, particularly on the basis of the signals delivered by the body sensor arrangement and/or on the basis of the signals delivered by the chassis sensor arrangements and/or on the basis of the body orientation signals and/or on the basis of the chassis orientation signals or the ground surface orientation signals, one or more or the one or the several wheel stroke signals, preferably those that characterize the one or the several wheel strokes, are and/or can be determined.

Preferably, the evaluation unit and/or the at least one estimator or estimators include a pitch angle estimator by means of which, particularly on the basis of the signals delivered by the body sensor arrangement and/or on the basis of the signals delivered by the chassis sensor arrangement, and/or on the basis of the body orientation signals and/or on the basis of the chassis or the ground surface orientation signals, at least one or the at least one pitch signal, preferably that characterizes the pitch angle or a pitch angle of the vehicle, is and/or can be determined.

Preferably, the evaluation unit and/or the at least one estimator or the estimators include a roll angle estimator by means of which, particularly on the basis of the signals delivered by the body sensor arrangement and/or on the basis of the signals delivered by the chassis sensor arrangement and/or on the basis of the body orientation signals and/or on the basis of the chassis or the ground orientation signals, at least one or the at least one roll angle signal, preferably that characterize the roll angle or a roll angle of the vehicle, is and/or can be determined.

Advantageously, the evaluation unit and/or the at least one estimator or the estimators include at least one optimizer, by means of which the estimator or estimators, or at least one of the estimators or several of the estimators, is/are and/or can be optimized, preferably by minimizing a quality functional.

The ground surface estimator, the wheel stroke estimator, the pitch angle estimator, the roll angle estimator, and preferably also the optimizer together form in particular an estimator unit. For example, the estimator unit also comprises the body estimator. The at least one or the several estimators form or include in particular the estimator unit.

In an advantageous design at least one height level sensor, in particular connected to the evaluation unit, is provided on one of the vehicle axles, by means of which sensor a height level or at least one height level of the vehicle axle is and/or can be determined and by which, preferably, at least one height level signal that characterizes the height level is and/or can be generated. Preferably, in particular by means of the evaluation unit, the one or more wheel strokes of the vehicle wheels or at least one or more of the wheel strokes are and/or can be verified with the help of or with reference to and/or by comparison with the height level signal. This can be advantageous particularly when an estimator is used. For the case of a faulty and/or implausible wheel stroke, in particular a calibration and/or a comparison of the evaluation unit and/or the estimator and/or the estimator unit is and/or can be carried out. Preferably the height level sensor is provided on one of the suspension control arms and/or integrated therein. Preferably the height level sensor is provided on or in a joint of the chassis and/or of one of the suspension control arms and/or integrated in the joint. The one vehicle axle is preferably the front axle or a front axle of the vehicle.

In an advantageous further development, on one of the vehicle axles a height sensor arrangement is provided, particularly one that is connected to the evaluation unit, by means of which sensor arrangement a height level or at least one height level of the vehicle axle is and/or can be determined, and preferably at least one height sensor signal that characterizes the height level is and/or can be generated. Preferably the one or more wheel strokes of the vehicle wheels or at least one or several of these wheel strokes are provided at another of the axles of the vehicle. Advantageously, the one or more or the at least one or several of the wheel strokes is and/or are determined in particular by means of the evaluation unit, preferably also taking into account the height level sensor signal and/or the pitch angle. Preferably, at least one of the chassis sensor arrangements is provided on the other vehicle axle and/or in the area of at least one of the vehicle wheels of the other vehicle axle. Preferably, one of the chassis sensor arrangements is provided in each case in the area of each vehicle wheel of the other vehicle axle. For example, on the other vehicle axle one of the chassis sensor arrangements is provided on the wheel carrier or a wheel carrier that carries the vehicle wheel or one of the vehicle wheels or the vehicle wheel concerned. In particular, on the other vehicle axle one of the chassis sensor arrangements is provided at each vehicle wheel on the suspension control arm that articulates the vehicle wheel or a vehicle wheel or at least one vehicle wheel or the vehicle wheel concerned to the vehicle body. The one vehicle axle is for example the front axle or a front axle. For example, on the one vehicle axle no chassis sensor arrangement is provided. The other vehicle axle is for example the rear axle or a rear axle.

The height level sensor arrangement comprises in particular a height level sensor or at least one height level sensor, or the one height level sensor, or the at least one height level sensor, or is formed by it. For example, the height level sensor arrangement comprises two or more height level sensors, wherein at each of the vehicle wheels of the one vehicle axle one of the height level sensors is provided. In this case one of the height level sensors is preferably formed by the one or at least one height level sensor.

The device according to the invention is in particular part of the vehicle. For example, the expression "Device for determining the height level in a vehicle" can even be replaced by the expression "Vehicle" or by the expression "Vehicle with a device for determining a height level" or by the expression "Vehicle with a device for determining a height level in the vehicle". The device according to the invention preferably comprises the at least one body sensor arrangement and/or the one or more chassis sensor arrangements and/or the evaluation unit and/or the height level sensor arrangement and/or the headlight device and/or the chassis and/or the vehicle body and/or the vehicle springs and/or the suspension control arms and/or each wheel carrier. Furthermore, for example, with the device according to the invention and/or with the method according to the invention, the expression "height level determination" can be replaced by the expression "wheel stroke determination".

BRIEF DESCRIPTION OF THE DRAWINGS

Below, the invention is described with reference to preferred embodiments and with reference to the drawing, which shows.

DETAILED DESCRIPTION

Figure 1:
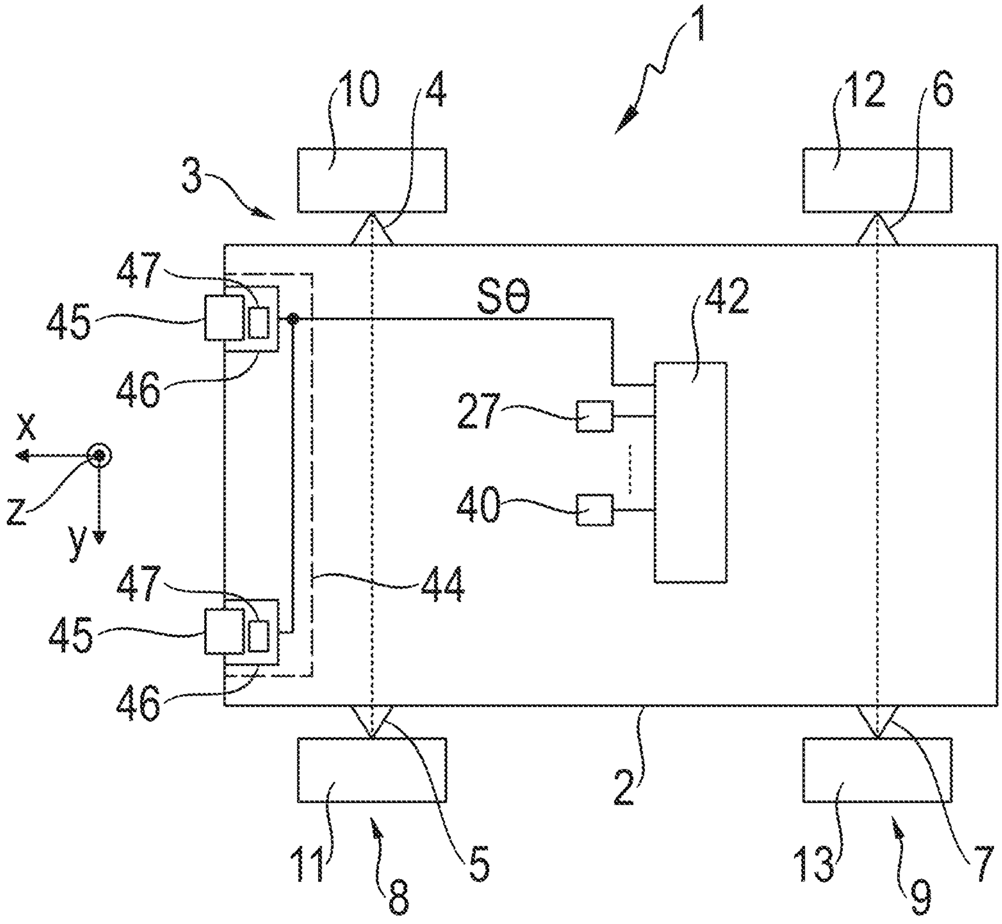
FIG. 1: A schematic view from above, of a vehicle according to a first embodiment.

FIG. 1 shows a schematic view from above, of a first embodiment of a vehicle 1 which comprises a vehicle body 2 and a chassis 3 with a number of wheel suspensions 4, 5, 6 and 7, of which the wheel suspensions 4 and 5 are associated with a front axle 8 and the wheel suspensions 6 and 7 are associated with a rear axle 9. Each wheel suspension includes a vehicle wheel, the wheel suspension 4 comprising the vehicle wheel 10, the wheel suspension 5 comprising the vehicle wheel 11, the wheel suspension 6 comprising the vehicle wheel 12 and the wheel suspension 7 comprising the vehicle wheel 13. In addition a coordinate system with a longitudinal direction x, a transverse direction y and a vertical direction z is shown.

Figure 2:
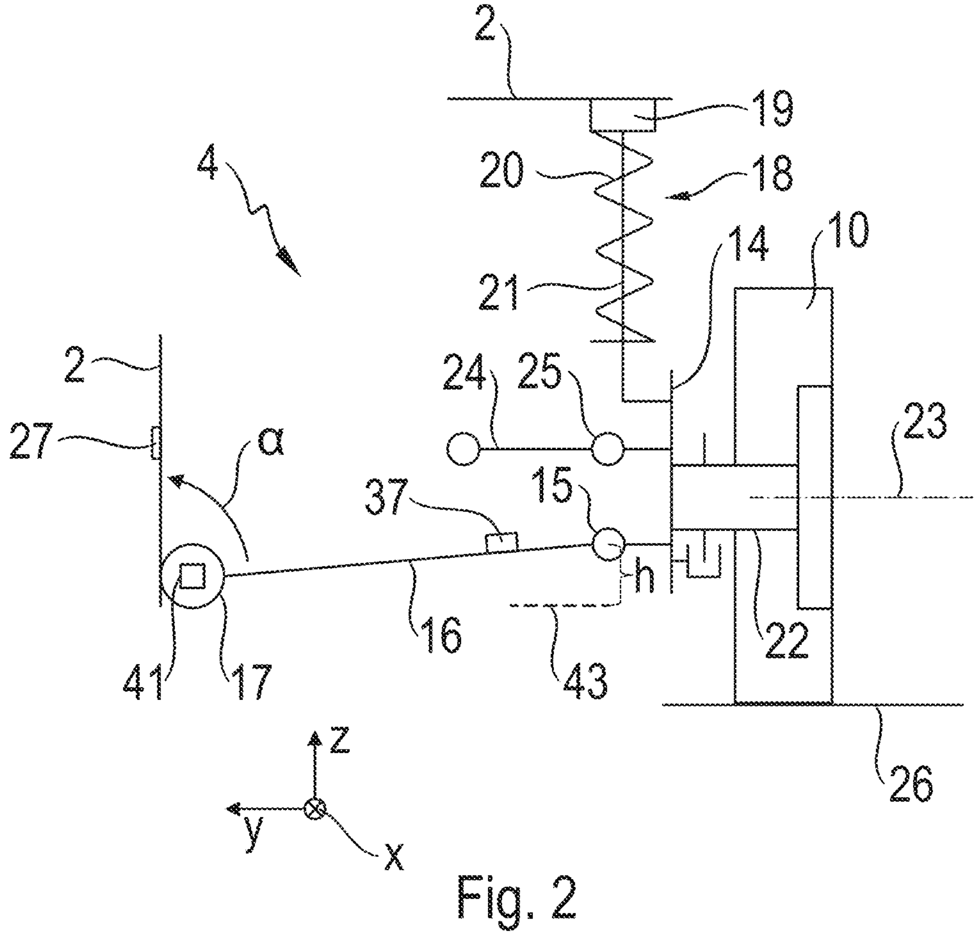
FIG. 2: A schematic view of a wheel suspension of the vehicle according to the first embodiment.

FIG. 2 shows a schematic view of the wheel suspension 4, which comprises a wheel carrier 14 which is connected by a joint 15 preferably in the form of a ball joint to a suspension control arm 16 preferably in the form of a transverse control arm, whose end remote from the wheel carrier 14 is articulated to the vehicle body 2 by a joint 17 preferably in the form of a rubber bearing. Moreover, the wheel carrier 14 is in particular firmly connected to a shock-absorber 18 whose end remote from the wheel carrier 14 is connected to the vehicle body 2 by way of a shock-absorber support bearing 19. The shock-absorber 18 comprises a vehicle spring 20, and a damper 21 which is in particular surrounded by the vehicle spring 20, the latter preferably in the form of a helical spring. To the wheel carrier 14 is attached a wheel bearing 22 by means of which the vehicle wheel 10 is mounted to rotate on the wheel carrier 14 about a wheel rotation axis 23. In addition, a track-rod 24 is connected to the wheel carrier 14 by means of a joint 25 preferably in the form of a ball joint. The vehicle wheel 10 is in contact with a ground surface 26, which for example is a street or a road.

Figure 3:
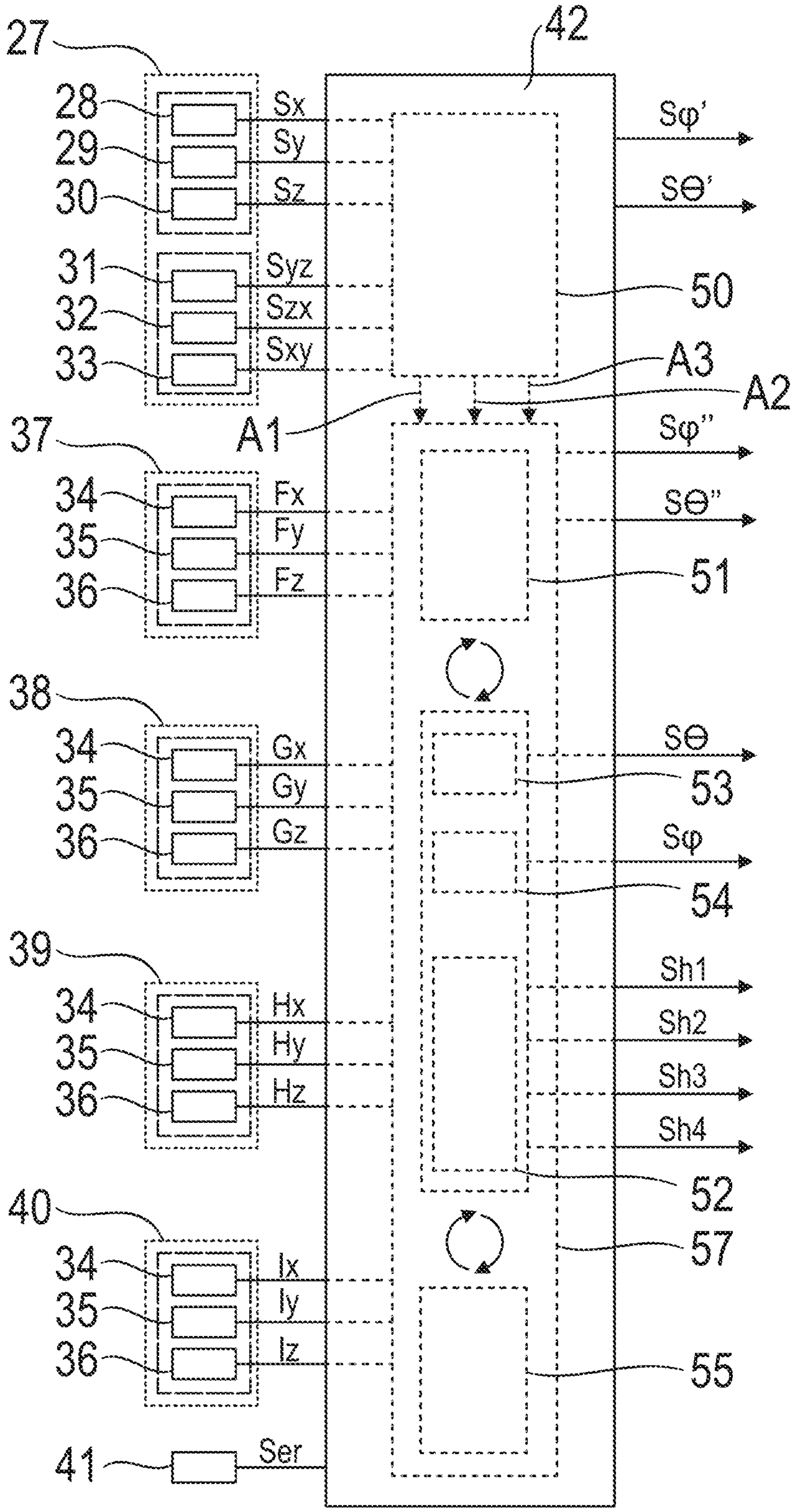
FIG. 3: A schematic representation of a device for height level determination, according to the first embodiment.

On the vehicle body 2 a body sensor arrangement 27 is provided, which in this example embodiment comprises three translational acceleration sensors 28, 29 and 30 and three rotation rate sensors 31, 32 and 33 (see FIG. 3). In addition, in this example embodiment a chassis sensor arrangement 37 comprising three translational acceleration sensors 34, 35 and 36 is provided on the suspension control arm 16 (see FIG. 3). Optionally, the chassis sensor arrangement 37 can also comprise three rotation rate sensors.

The wheel suspension 5 is preferably fitted laterally reversed relative to the wheel suspension 4. Furthermore, the wheel suspension 7 is preferably fitted laterally reversed relative to the wheel suspension 6. In particular, the front axle 8 is designed to be steered. The rear axle is for example designed to be steerable or not steerable. Apart from that, the wheel suspensions 4, 5, 6 and 7 are in particular designed in the same way, so that each wheel suspension has a chassis sensor arrangement as described earlier, with three acceleration sensors 34, 35 and 36, wherein the chassis sensor arrangement of the wheel suspension 5 is indexed 38, the chassis sensor arrangement of the wheel suspension 6 is indexed 39 and the chassis sensor arrangement of the wheel suspension 7 is indexed 40 (see FIG. 3).

Furthermore, a height level sensor 41 is provided on the joint 17, by means of which, by measuring an angle $\alpha$ between the vehicle body 2 and the suspension control arm 16, a height level of the vehicle wheel 10 can be determined and a height level signal Ser that characterizes the height level can be generated (see FIG. 3). According to a possible alternative the height level sensor is provided for example on the joint 15, so that for example by measuring an angle enclosed between the wheel carrier 14 and the suspension control arm 16 the height level can be determined. Optionally a corresponding height level sensor is provided on the wheel suspension 5, by means of which a height level of the vehicle wheel 11 can be determined and a height level signal characterizing that height level can be generated. In that case the height level sensors together form in particular a height level sensor arrangement.

FIG. 3 shows a schematic representation of a device for height level determination in accordance with the first embodiment, wherein it can be seen that the sensors of the sensor arrangements 27, 37, 38, 39 and 40 and the height level sensor 41 are connected to an evaluation unit 42.

The acceleration sensors 28, 29 and 30 of the body sensor arrangement 27 generate acceleration signals Sx, Sy and Sz that characterize accelerations that occur at the vehicle body 2. Furthermore, the rotation rate sensors 31, 32 and 33 of the body sensor arrangement 27 generate angular velocity signals Syz, Szx and Sxy that characterize rotation movements that occur at the vehicle body 2. The acceleration sensors 34, 35 and 36 of the chassis sensor arrangement 37 generate acceleration signals Fx, Fy and Fz that characterize accelerations occurring at the suspension control arm 16. Moreover, the acceleration sensors 34, 35 and 36 of the chassis sensor arrangement 38 generate acceleration signals Gx, Gy and Gz that characterize the accelerations occurring at a suspension control arm of the wheel suspension 5, which control arm is preferably in the form of a transverse control arm. In addition, the acceleration sensors 34, 35 and 36 of the chassis sensor arrangement 39 generate acceleration signals Hx, Hy and Hz that characterize the accelerations occurring at a suspension control arm of the wheel suspension 6, which control arm is preferably in the form of a transverse control arm. Finally, the acceleration sensors 34, 35 and 36 of the chassis sensor arrangement 40 generate acceleration signals Ix, Iy and Iz that characterize the accelerations occurring at a suspension control arm of the wheel suspension 7, which control arm is preferably in the form of a transverse control arm.

With the help of the body sensor arrangement 27 the orientation of the vehicle body 2 can be determined. In particular, by means of the evaluation unit 42 several body orientation information particulars are determined in the form of angles Θ' and ϕ' and body orientation signals SΘ' and Sϕ' that characterize these body orientation particulars are generated. Moreover, with the help of the chassis sensor arrangements 37, 38, 39 and 40 the orientation of the suspension control arms of the wheel suspensions 4, 5, 6 and 7 can be determined.

Figure 4:
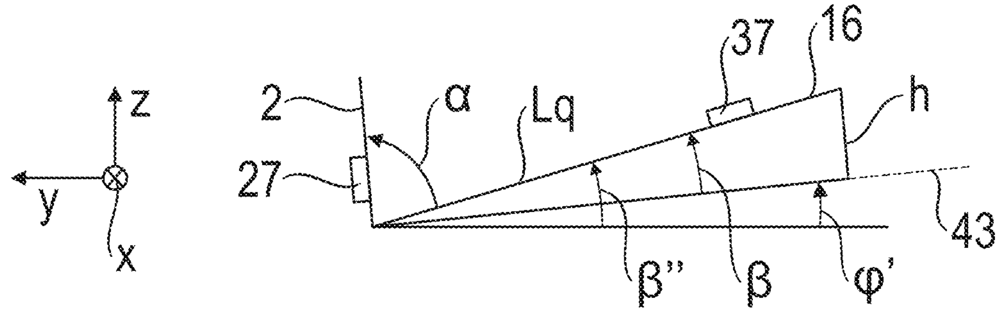
FIG. 4: A schematic representation to illustrate the determination of a wheel stroke, according to the first embodiment.

From the orientation of the vehicle body 2 and the orientation of the suspension control arms, the wheel strokes can be determined as explained with reference to FIGS. 2 and 4 for the wheel stroke h of the vehicle wheel 10. In FIG. 2 a wheel stroke h of the vehicle wheel 10 relative to a reference position 43 is shown, which position is in particular positionally fixed relative to the vehicle body 2.

By means of the chassis sensor arrangement 37 the inclination ß" of the suspension control arm 16 in the y-z plane is determined. In addition, by means of the body sensor arrangement 27 the inclination ϕ' of the vehicle body 2 in the y-z plane is determined. The difference between these two angles gives the inclination ß=ß"−ϕ' of the suspension control arm 16 relative to the vehicle body 2, which in particular can be seen in FIG. 4. If the length of the suspension control arm 16 between the vehicle body 2 and the wheel carrier 14 or the vehicle wheel 10 is Lq, then the relationship sin(ß)=h/Lq applies. From this the wheel stroke h of the vehicle wheel 10 can be determined as h=Lq*sin(B). The wheel strokes of the vehicle wheels 11, 12 and 13 can be determined correspondingly. In particular, the angle ß is related to the angle α by the equation ß=90°−α.

By means of the evaluation unit 42 the wheel strokes of the vehicle wheels 10, 11, 12 and 13 are determined and wheel stroke signals Sh1, Sh2, Sh3 and Sh4 that characterize the wheel strokes are generated. In this case the wheel stroke signal Sh1 characterizes the wheel stroke of the vehicle wheel 10, the wheel stroke signal Sh2 characterizes the wheel stroke of the vehicle wheel 11, the wheel stroke signal Sh3 characterizes the wheel stroke of the vehicle wheel 12 and the wheel stroke signal Sh4 characterizes the wheel stroke of the vehicle wheel 13.

Since the positional relationships between the vehicle body 2, the suspension control arms and the wheel carriers and/or vehicle wheels are governed by the wheel suspensions, from the orientations of the suspension control arms determined, for example the orientation of the ground surface 26 can also be determined, particularly when the influence of pneumatic tires is disregarded. Preferably, by means of the evaluation unit 42 several ground surface orientation particulars in the form of angles Θ" and ϕ" are determined and ground surface orientation signals SΘ" and ϕ" that characterize this ground surface orientation information are generated.

From the body orientation information Θ' and ϕ' and the ground surface orientation information Θ" and ϕ", a pitch angle Θ of the vehicle 1 can be determined, in particular by the evaluation unit 38, which in addition generates a pitch angle signal SΘ that characterizes the pitch angle Θ.

Furthermore, From the body orientation information Θ' and ϕ' and the ground surface orientation information Θ" and ϕ", a roll angle ϕ of the vehicle 1 can be determined, in particular by the evaluation unit 38, which in addition generates a roll angle signal Sϕ that characterizes the roll angle ϕ.

The evaluation unit 42 comprises in particular a body estimator 50 by means of which, in particular on the basis of the signals generated by the body sensor arrangement 27, several body orientation signals A1, A2, and A3 that characterize the orientation of the vehicle body 2 are determined. Preferably, the signals SΘ' and Sϕ' can be derived from the signals A1, A2, and A3.

Furthermore, the evaluation unit 42 comprises a ground surface estimator 51 by means of which, in particular on the basis of the signals generated by the chassis sensor arrangements 37, 38, 39 and 40, the ground surface orientation signals SΘ" and Sϕ" that characterize the orientation of the ground surface are preferably generated.

The evaluation unit 42 also comprises a wheel stroke estimator by means of which in particular on the basis of the signals generated by the chassis sensor arrangements 37, 38, 39, and 40 and/or on the basis of the signals generated by the body sensor arrangement 27 or the body orientation signals A1. A2, and A3 and/or on the basis of the ground orientation signals SΘ" and Sϕ", wheel stroke signals Sh1, Sh2, Sh3 and Sh4 that characterize the wheels strokes of the vehicle wheels are preferably generated and/or can be generated.

In addition, the evaluation unit 42 comprises a pitch angle estimator by means of which, in particular on the basis of the signals generated by the chassis sensor arrangements 37, 38, 39 and 40, and/or on the basis of the signals generated by the body sensor arrangement 27 or the body orientation signals A1, A2 and A3 and/or on the basis of the ground surface orientation signals SΘ" and Sϕ", the pitch angle signal SΘ or at least one pitch angle signal SΘ that characterizes the pitch angle of the vehicle is generated.

In addition, the evaluation unit 42 comprises a roll angle estimator 54 by means of which, in particular on the basis of the signals generated by the chassis sensor arrangements 37, 38, 39 and 40, and/or on the basis of the signals generated by the body sensor arrangement 27 or the body orientation signals A1, A2 and A3, and/or on the basis of the ground surface orientation signals SΘ" and Sϕ", the roll angle signal or at least one roll angle signal Sϕ that characterizes the roll angle of the vehicle is generated.

In particular the evaluation unit 42 comprises an optimizer 55, by means of which for example the ground surface estimator 51 and/or the wheel stroke estimator 52 and/or the pitch angle estimator 53 and/or the roll angle estimator 54 is/are or can be optimized.

The ground surface estimator 51, the wheel stroke estimator 52, the pitch angle estimator 53, the roll angle estimator 5 and preferably also the optimizer 55 together form in particular an estimator unit 57, which for example is also called the estimator. The estimator unit 57 can for example also include the body estimator 50.

Preferably, at least one of the wheel strokes, in particular the wheel stroke h of the vehicle wheel 10, can be verified preferably by the evaluation unit 42 with reference to the height level signal Ser. In the case when there is a faulty and/or implausible wheel stroke, in particular a calibration and/or a comparison of the evaluation unit 42 and the estimator unit 57 is carried out.

The vehicle 1 has a headlight device 44 with two headlights 45, two headlight units on which the headlights 45 are fitted and can swivel, and two headlight adjusting drives 47 by means of which the inclination of the headlights 45 can be adjusted, particularly in the z-x plane, as a function of the pitch angle Θ. For this, in particular the pitch angle signal SΘ is available to the headlight device 44, which is connected to the evaluation unit 42 as can be seen in FIG. 1.

A determination of the pitch angle Θ and the roll angle ϕ is explained below with reference to FIGS. 5 and 6.

Figure 5:
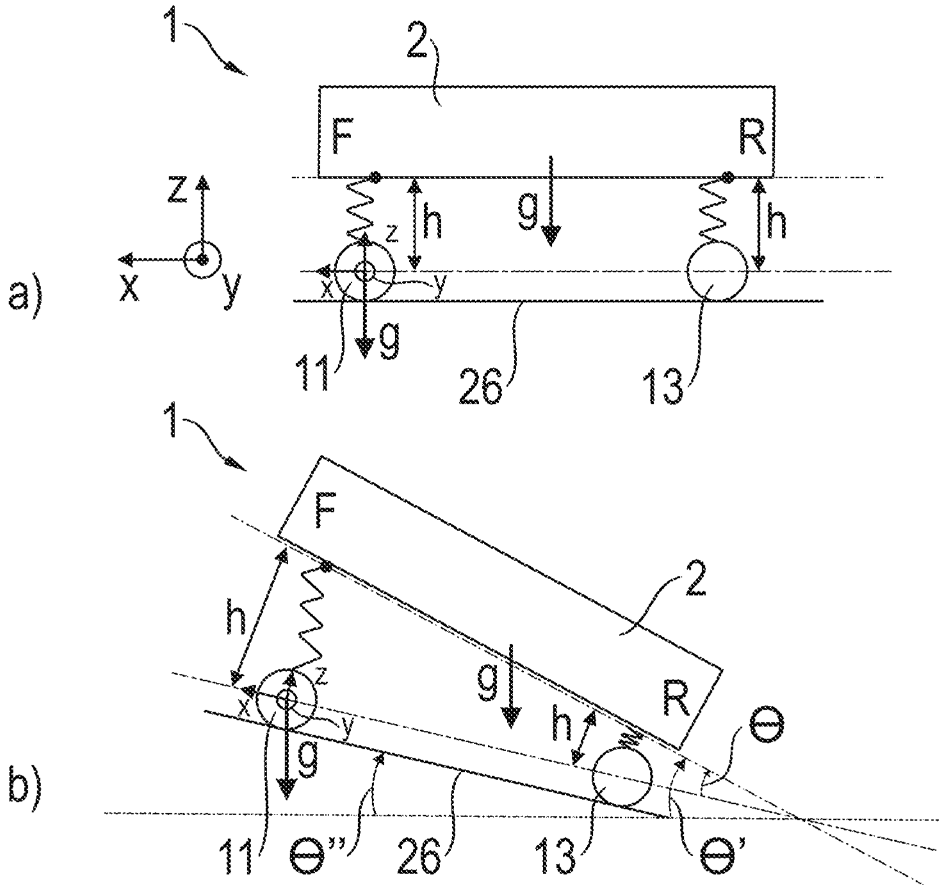
FIG. 5: A schematic representation to illustrate the determination of a pitch angle, according to the first embodiment.

In FIG. 5, on the left-hand side indexed a) the unloaded vehicle 1, at rest, is shown schematically in its designed position on level ground 26. Consequently, the pitch angle and the roll angle are both equal to zero.

Furthermore, on the right-hand side of FIG. 5 indexed b) the vehicle 1 preferably also loaded at the rear is shown schematically on an inclined ground surface 26, so that pitching of the vehicle 1 takes place. By means of the body sensor arrangement 27 an orientation of the vehicle body 2 in the z-x plane is detected, wherein this orientation is represented by an angle Θ'. Moreover, by means of the chassis sensor arrangements 37, 38, 39 and 40 an orientation of the ground surface 26 in the z-x plane is detected, wherein this orientation is represented by an angle Θ". The angle Θ' characterizes an orientation of the vehicle body 2 and thus forms specifically a body orientation information particular. The angle Θ" characterizes an orientation of the chassis 3 or of the ground surface 26, and thus forms specifically a chassis or ground surface orientation information particular.

Thus, the pitch angle is given by the difference between the angles Θ' and Θ" determined, namely: $\Theta=\Theta'-\Theta''$.

In FIG. 5, the index g stands for the acting acceleration due to gravity. F for "front" and R for "rear".

Figure 6:
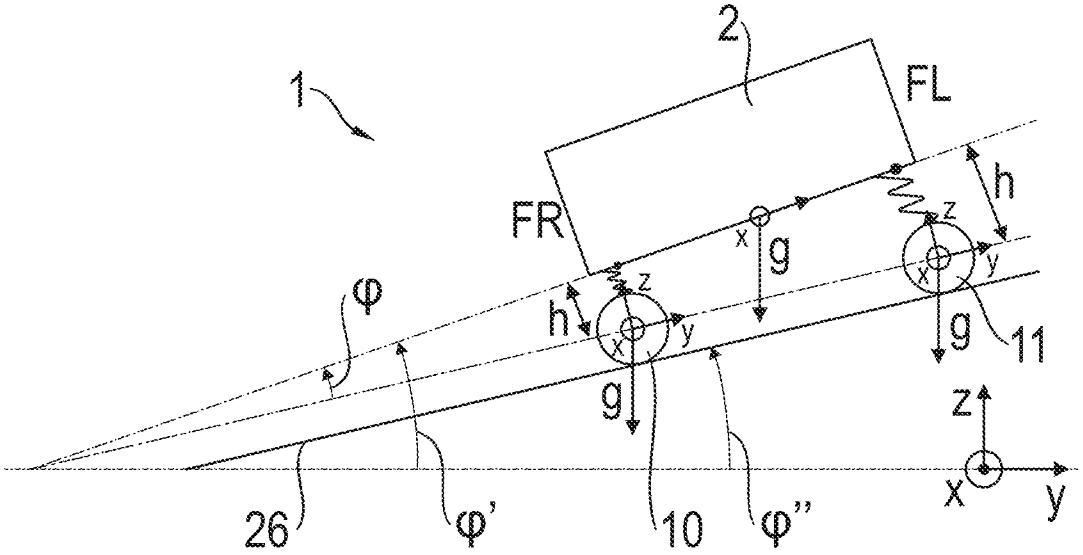
FIG. 6: A schematic representation to illustrate the determination of a roll angle, according to the first embodiment.

According to FIG. 6 the vehicle 1 is shown schematically on an inclined ground surface 26, so that rolling of the vehicle 1 takes place. By means of the body sensor arrangement 27 an orientation of the vehicle body 2 in the y-z plane is detected, wherein this orientation is represented by an angle ϕ'. Further, by means of the chassis sensor arrangements 37, 38, 39 and 40 the orientation of the ground surface in the y-z plan is detected, wherein this orientation is represented by an angle ϕ". The angle ϕ' characterizes an orientation of the vehicle body 2 and thus constitutes specifically another body orientation information particular. The angle ϕ" characterizes an orientation of the chassis 3 or ground surface 26 and thus constitutes specifically another body orientation information particular.

Thus, the roll angle t is given by the difference between the angles ϕ' and ϕ" determined, namely: $\phi=\phi'-\phi''$.

In FIG. 6, the index g stands for the acting acceleration due to gravity, FR for "front right" and FL for "front left".

Figure 7:
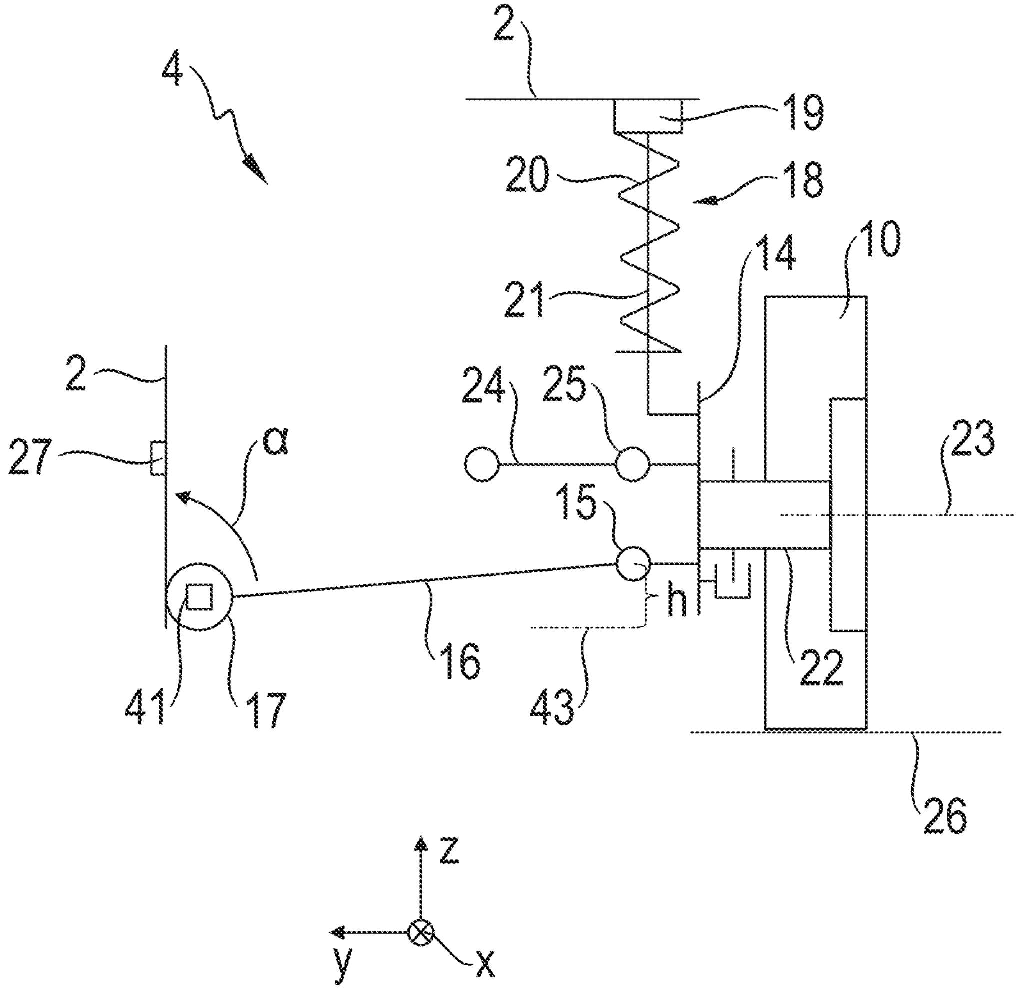
FIG. 7: A schematic view of a wheel suspension of the vehicle according to a second embodiment.

FIG. 7 shows a schematic view of a wheel suspension 4 of a vehicle, according to a second embodiment, wherein features identical or similar to those of the first embodiment are given the same indexes as in the first embodiment.

Figure 8:
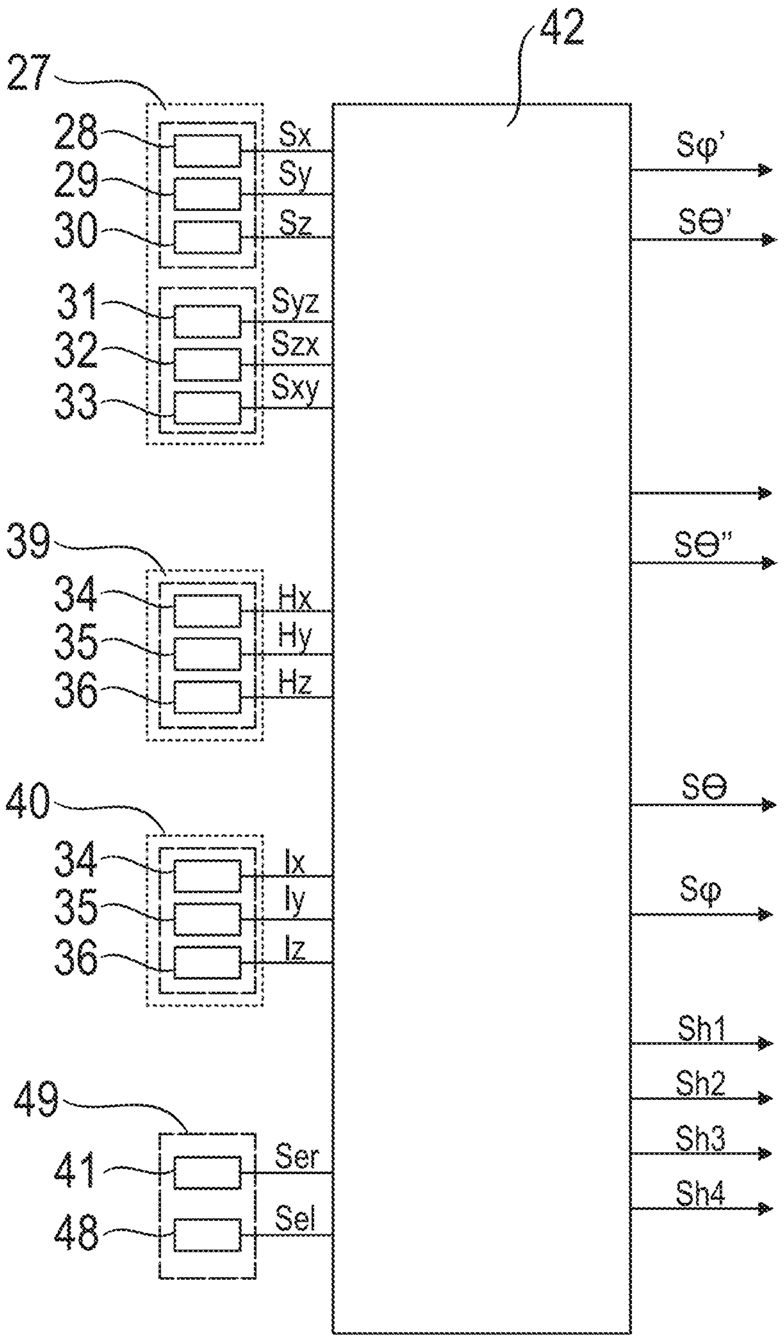
FIG. 8: A schematic representation of a device for height level determination, according to the second embodiment.

In this second embodiment too a height level sensor 41 is provided on the joint 17, by means of which sensor a height level of the vehicle wheel 10 can be determined by measuring an angle α between the vehicle body 2 and the suspension control arm 16, and a height level signal Ser characterizing the height level can be generated (see FIG. 8). According to a possible alternative the height level sensor is for example provided on the joint 15, so that for example by measuring an angle enclosed between the wheel carrier 14 and the suspension control arm 16 the height level can be determined. Furthermore, in the wheel suspension 5 a corresponding height level sensor 48 is provided, by means of which a height level of the vehicle wheel 11 can be determined and a height level signal Sel that characterizes the height level can be generated (see FIG. 8). The height level sensors 41 and 48 together form a height level sensor arrangement 49 (see FIG. 8).

In accordance with the first embodiment, on the rear axle 9 the chassis sensor arrangements 39 and 40 are provided. Other than in the first embodiment, on the suspension control arms of the front axle no chassis sensor arrangements and/or acceleration sensors are provided.

FIG. 8 shows a schematic representation of a device for determining the height level in accordance with the second embodiment, wherein it can be seen that the sensors of the sensor arrangements 27, 39 and 40 and the height level sensors 41 and 48 of the height level sensor arrangement 49 are connected to the evaluation unit 42.

According to the second embodiment, the wheel strokes of the vehicle wheels 10 and 11 of the front axle 8 are determined from the height level signals Ser and Sel generated, and are provided in the form of wheel stroke signals Sh1 and Sh2 that characterize the wheel strokes of the vehicle wheels 10 and 11 of the front axle 8. Moreover, according to a first alternative, from the height level signals Ser and Sel provided, by means of the evaluation unit 42 the roll angle ϕ of the vehicle can be determined and generated in the form of a roll angle signal Sϕ that characterizes the roll angle ϕ.

According to a second alternative, however, the roll angle ϕ of the vehicle can be determined by the evaluation unit 42 on the basis of the signals provided by the sensor arrangements 27, 39 and 40, wherein in addition the height level signals Ser and Sel generated by the height level sensors 41 and 48 are preferably also taken into account. In particular, by means of the evaluation unit 42 the roll angle signal Sϕ that characterizes the roll angle is generated.

The body orientation information particulars Θ' and ϕ', the ground surface orientation information Θ" and ϕ", the wheel strokes of the vehicle wheels 12 and 13 of the rear axle 9 and the pitch angle Θ of the vehicle are determined in particular by the evaluation unit 42 on the basis of the signals generated by the sensor arrangements 27, 39 and 40, wherein in addition the height level signals Ser and Sel generated by the height level sensors 41 and 48 are preferably also taken into account. Furthermore, by means of the evaluation unit 42 the body orientation signals SΘ' and Sϕ' that characterize the body orientation information, the ground surface orientation signals SΘ" and Sϕ" that characterize the ground surface orientation information Θ" and ϕ", the wheel stroke signals Sh3 and Sh4 that characterize the wheel strokes of the vehicle wheels 12 and 13 on the rear axle 9, and the pitch angle signal SΘ that characterizes the pitch angle Θ are generated.

Apart from those differences the second embodiment accords in particular with the first embodiment, so that for any further description of the second embodiment reference should be made to the description of the first embodiment. For example, for the second embodiment too FIG. 1 and its description can be referred to.

Figure 9:
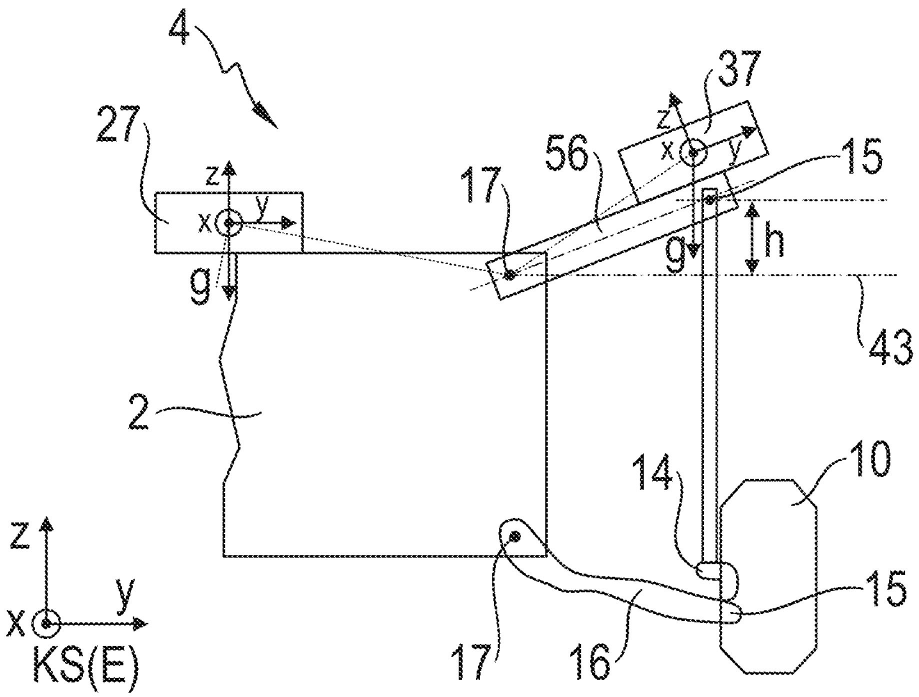
FIG. 9: A schematic view of a wheel suspension of the vehicle according to a third embodiment.

FIG. 9 shows a schematic view of a wheel suspension 4 of a vehicle according to a third embodiment, wherein features the same as or similar to those of the first embodiment are given the same indexes as those of the first embodiment.

Other than in the first embodiment, the wheel suspension 4 according to the third embodiment comprises two transverse control arms 16 and 56 arranged one above the other in the vertical direction of the vehicle, which are respectively articulated by a joint 15 on the wheel carrier 14 and a joint 17 on the vehicle body 2. In this case the chassis sensor arrangement 37 is provided on the upper transverse control arm 56. Correspondingly, the chassis sensor arrangements 38, 39 and 40 are provided on the upper transverse control arms of their respective wheel suspensions 5, 6 and 7.

Apart from these differences the third embodiment accords in particular with the first embodiment, so that for any further description of the third embodiment reference should be made to the description of the first embodiment. For example, for the second embodiment too, FIGS. 1 and 3 to 6 and their descriptions can be referred to.

Figure 10:
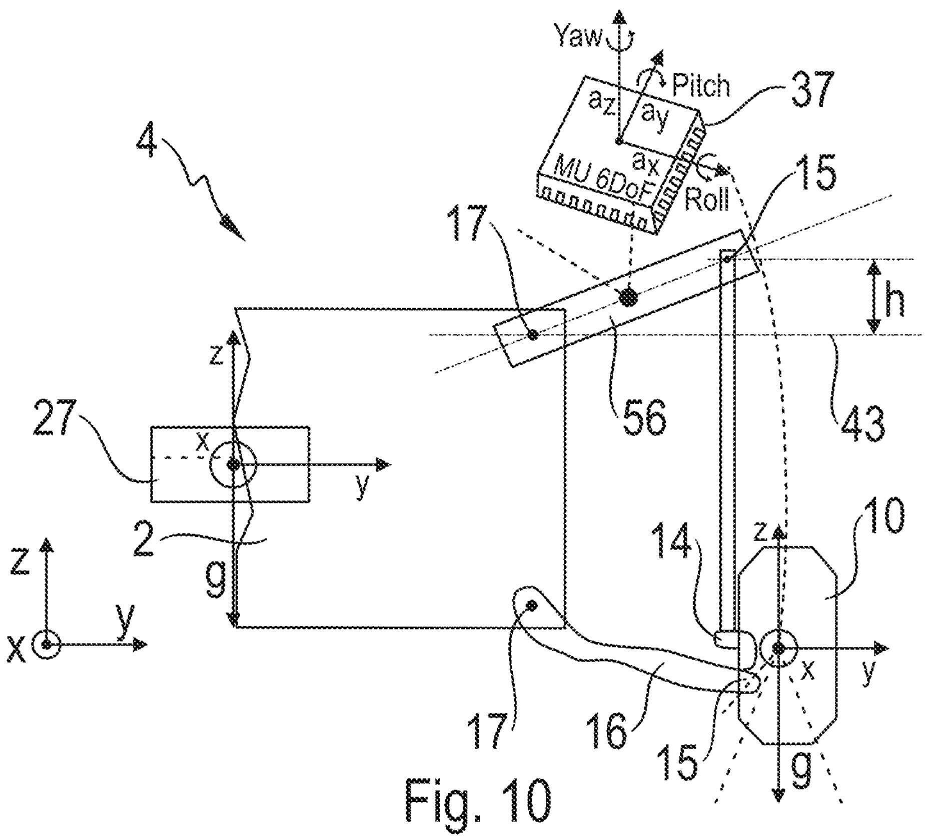
FIG. 10: A schematic view of a wheel suspension of the vehicle according to a fourth embodiment.

FIG. 10 shows a schematic view of a wheel suspension 4 of a vehicle according to a fourth embodiment, wherein features the same as or similar to those of the first embodiment are given the same indexes as those of the first embodiment.

Other than in the first embodiment, the wheel suspension 4 according to the fourth embodiment comprises two transverse control arms 16 and 56 arranged one above the other in the vertical direction of the vehicle, which are respectively articulated by a joint 15 on the wheel carrier 14 and a joint 17 on the vehicle body 2. In this case the chassis sensor arrangement 37 is provided on the upper transverse control arm 56. Correspondingly, the chassis sensor arrangements 38, 39 and 40 are provided on the upper transverse control arms of their respective wheel suspensions 5, 6 and 7. According to a possible variant, however, each chassis sensor arrangement can be provided on the respective lower transverse control arm or on the wheel carrier.

Furthermore, otherwise than in the first embodiment each chassis sensor arrangement 37, 38, 39 and 40 is an inertial measuring unit (IMU), in particular in the form of a microsystem for detecting six kinematic degrees of freedom, which in FIG. 10 is indicated in particular by the abbreviation "6DofF" (6 Degrees of Freedom) for "six degrees of freedom", and by the symbolically indicated rotation angle "Roll" for rolling, "Pitch" for pitching and "Yaw" for yawing. By additionally taking into account rotational degrees of freedom in the chassis sensor arrangements, the accuracy can be increased compared with the first embodiment.

Apart from those differences, the fourth embodiment accords in particular with the first embodiment so that for any further description of the fourth embodiment reference should be made to the description of the first embodiment. For example, for the fourth embodiment too, FIGS. 1 and 3 to 6 and their descriptions can be referred to. In the case of FIG. 3, however, in particular three rotation sensors in each of the sensor arrangements 37, 38, 39 and 40 should also be taken into account.

INDEXES

1 Vehicle
2 Vehicle body
3 Chassis
4 Wheel suspension
5 Wheel suspension
6 Wheel suspension
7 Wheel suspension
8 Front axle
9 Rear axle
10 Vehicle wheel
11 Vehicle wheel
12 Vehicle wheel
13 Vehicle wheel
14 Wheel carrier
15 Joint/ball joint
16 Suspension control arm/transverse control arm
17 Joint/ball joint
18 Shock-absorber
19 Shock-absorber support bearing
20 Vehicle spring
21 Damper
22 Wheel bearing
23 Wheel rotation axis
24 Track-rod
25 Joint/ball joint
26 Ground surface
27 Body sensor arrangement
28 Acceleration sensor
29 Acceleration sensor
30 Acceleration sensor
31 Rotation rate sensor
32 Rotation rate sensor
33 Rotation rate sensor
34 Acceleration sensor
35 Acceleration sensor
36 Acceleration sensor
37 Chassis sensor arrangement
38 Chassis sensor arrangement
39 Chassis sensor arrangement
40 Chassis sensor arrangement
41 Height level sensor
42 Evaluation unit
43 Reference position
44 Headlight device
45 Headlight
46 Headlight holding device
47 Headlight adjusting device
48 Height level sensor
49 Height level sensor arrangement
50 Body estimator
51 Ground surface estimator
52 Wheel stroke estimator
53 Pitch angle estimator
54 Roll angle estimator
55 Optimizer
56 Upper transverse control arm
57 Estimator unit
ϕ Roll angle
Θ Pitch angle
Sx Acceleration signal
Sy Acceleration signal Sz Acceleration signal
Syz Angular velocity signal
Szx Angular velocity signal
Sxy Angular velocity signal
Ser Height level signal
Sel Height level signal
Fx Acceleration signal
Fy Acceleration signal
Fz Acceleration signal
Gx Acceleration signal
Gy Acceleration signal
Gz Acceleration signal
Hx Acceleration signal
Hy Acceleration signal
Hz Acceleration signal
Ix Acceleration signal
Iy Acceleration signal
Iz Acceleration signal

The invention claimed is:

1. A device for determining the height level in a vehicle having a chassis with a plurality of vehicle wheels which stand or roll on a ground surface, a vehicle body carried on the chassis, which body is connected by vehicle springs to unsprung components of the chassis, which include the vehicle wheels, which are articulated to the vehicle body by suspension control arms, and at least one vehicle axle which comprises two of the vehicle wheels, the device comprising:

a plurality of sensor arrangements of which at least one body sensor arrangement is provided on the vehicle body and one or more chassis sensor arrangements are provided on the unsprung components of the chassis and/or on the suspension control arms, wherein each sensor arrangement comprises at least one or more acceleration sensors configured to determine translational accelerations in different spatial directions and to generate acceleration signals that characterize the accelerations;

at least one height level sensor on the at least one vehicle axle configured to determine a height level of the at least one vehicle axle and to generate a height level signal that characterizes the height level; and an evaluation unit connected to the plurality of sensor arrangements and connected to the at least one height level sensor;

wherein the body sensor arrangement comprises at least one rotation sensor configured to determine rotation movements about different rotation axes and to generate body rotation movement signals that characterize the rotation movements, wherein the evaluation unit is configured to determine one or more wheel strokes of the vehicle wheels from the acceleration signals and the body rotation movement signals and to verify the one or more wheel strokes of the vehicle wheels with reference to the height level signal.

2. The device according to claim 1, wherein the at least one rotation movement sensor of the body sensor arrangement has a form of a rotation rate sensor and is configured to determine the rotation movements in the form of angular velocities.

3. The device according to claim 1, wherein the at least one body sensor arrangement is configured to detect six kinematic degrees of freedom.

4. The device according to claim 1, wherein each of the one or more chassis sensor arrangements is designed to detect at least three kinematic degrees of freedom.

5. The device according to claim 1, wherein the evaluation unit is configured to determine from the signals generated by the sensor arrangement a pitch angle of the vehicle.

6. The device according to claim 1, wherein the evaluation unit is configured to determine from the signals generated by the sensor arrangements a roll angle of the vehicle.

7. The device according to claim 1, wherein the evaluation unit comprises at least one estimator that is configured to determine by estimation the one or more wheel strokes of the vehicle wheels.

8. A method for height level determination in a vehicle, comprising:

providing a chassis with a plurality of vehicle wheels which stand or roll on a ground surface and at least one vehicle axle which comprises two of the vehicle wheels, wherein on the at least one vehicle axle at least one height level sensor is provided;

providing a vehicle body carried by the chassis, which body is connected by vehicle springs to unsprung components of the chassis, which comprise the vehicle wheels which are articulated to the vehicle body by suspension control arms;

providing a plurality of sensor arrangements, of which one body sensor arrangement is provided on the vehicle body and one or more chassis sensor arrangements are provided on the unsprung components of the chassis and/or on the suspension control arms, wherein every sensor arrangement comprises at least one or more acceleration sensors;

detecting accelerations in different spatial directions;

generating acceleration signals that characterize the accelerations;

detecting, by at least one rotation movement sensor, rotation movements about different rotation axes;

detecting, by the at least one rotation movement sensor, body rotation signals that characterize the rotation movements generated;

determining, using the at least one height level sensor, a height level of the at least one vehicle axle;

generating, by the at least one height level sensor, at least one height level signal that characterizes the height level;

determining, from the acceleration signals and the body rotation signals, one or more wheel strokes of the vehicle wheels; and verifying the one or more wheel strokes of the vehicle wheels with reference to the height level signal.

9. The method according to claim 8, comprising determining a pitch angle from the signals generated by the sensor arrangements.

10. The method according to claim 8, comprising determining a roll angle from the signals generated by the sensor arrangements.

11. The method according to claim 8, comprising determining the rotation movements, in the form of angular velocities, using the at least one rotation movement sensor of the body sensor arrangement as a rotation rate sensor.

12. The method according to claim 8, comprising detecting, using the body sensor arrangement, six kinematic degrees of freedom.

13. The method according to claim 8, comprising detecting, using each of the one or more chassis sensor arrangements, at least three kinematic degrees of freedom.

14. The method according to claim 8, comprising determining the one or more wheel strokes of the vehicle wheels by estimation.

* * * * *